(12) United States Patent
Davies

(10) Patent No.: US 10,559,219 B1
(45) Date of Patent: Feb. 11, 2020

(54) MAGNETIC MUSICAL TILES AND MAT

(71) Applicant: Hilda Joan Davies, Casper, WY (US)

(72) Inventor: Hilda Joan Davies, Casper, WY (US)

(*) Notice: Subject to any disclaimer, the term of this patent is extended or adjusted under 35 U.S.C. 154(b) by 0 days.

(21) Appl. No.: 16/277,866

(22) Filed: Feb. 15, 2019

(51) Int. Cl.
*G09B 15/02* (2006.01)

(52) U.S. Cl.
CPC .................................. *G09B 15/023* (2013.01)

(58) Field of Classification Search
CPC .................................................... G09B 15/023
See application file for complete search history.

(56) References Cited

U.S. PATENT DOCUMENTS

| | | | | |
|---|---|---|---|---|
| 145,622 A * | 12/1873 | Brown et al. | ........ | G09B 15/026 84/471 R |
| 1,099,372 A * | 6/1914 | Hughes | ................ | G09B 15/026 84/471 R |
| 1,319,919 A * | 10/1919 | Barker | ................ | G09B 15/026 84/471 R |
| 1,320,746 A * | 11/1919 | Egener | ................ | G09B 15/026 84/471 R |
| 1,433,850 A * | 10/1922 | Schnitker | ............. | G09B 15/026 84/471 R |
| 1,666,382 A * | 4/1928 | Hoffmeister | ........... | G09B 15/02 84/471 R |
| 1,858,140 A * | 5/1932 | Dewhirst | ............. | G09B 15/026 84/471 R |
| 1,879,002 A * | 9/1932 | Alles | ...................... | G09B 15/02 40/621 |
| 2,082,432 A * | 6/1937 | Von Der Linden | ......................... | G09B 15/026 84/471 R |
| 2,864,275 A * | 12/1958 | Fraleigh | .................... | G10G 1/00 84/471 R |
| 3,530,758 A * | 9/1970 | Stillo | .................... | G09B 21/003 84/471 R |
| 3,715,951 A * | 2/1973 | Lanaro | .................... | G09B 15/02 84/470 R |
| 3,733,957 A * | 5/1973 | Peirano | .................. | G09B 15/02 84/471 R |
| 4,736,665 A * | 4/1988 | Sorribes Arambul | ....................... | G09B 15/026 84/471 R |
| 4,819,539 A * | 4/1989 | Searing | ................ | G09B 15/023 273/301 |
| 6,967,274 B2 * | 11/2005 | Hanington | ............. | G09B 15/02 84/470 R |
| 7,482,524 B1 * | 1/2009 | Hanington | ............. | G09B 15/02 84/470 R |
| 7,754,954 B2 * | 7/2010 | Neil | ...................... | G09B 15/023 84/470 R |
| 7,956,271 B1 | 6/2011 | Jonas | | |
| 8,188,356 B2 * | 5/2012 | Rose | .................... | G09B 21/003 84/447 |
| 9,728,099 B2 * | 8/2017 | Armstrong | ........... | G09B 15/023 |

(Continued)

*Primary Examiner* — Robert W Horn
(74) *Attorney, Agent, or Firm* — Peter J Timbers

(57) ABSTRACT

An apparatus to teach and instruct musical concepts such as timing, syncopation, notes, rests, and pitch wherein a mat having nine portions horizontally arranged is attached to a vertical surface and magnetic musical tiles are attached thereto such that a bar of music can be explained and modified to facilitate understanding of musical concepts via a mat having quarter notes imprinted upon it and having adjustable magnetic bar line tiles to accommodate various time signatures.

20 Claims, 6 Drawing Sheets

(56) References Cited

U.S. PATENT DOCUMENTS

2011/0252946 A1* 10/2011 Armstrong ........... G09B 15/023
                                                84/483.2

* cited by examiner

MAGNETIC MUSICAL TILES AND MAT

FIELD OF THE INVENTION

This invention relates generally to an apparatus to aid music students in learning and applying musical beats, notes and timing to a variable bar line tiles in a given measure.

BACKGROUND OF THE INVENTION

In teaching and explaining music, there exists a number of different ways to explain concepts to teach students basic and advanced concepts. There exists the block method as disclosed U.S. Pat. No. 7,956,271. A common feature, even in a modern sense is a board having erasable marks and prefigured notes attached to a board. In other examples, U.S. Pat. Nos. 8,188,356 and 7,754,954 there are assortments of mats, notes and tiles for attachment to a board, but all of these disclosures lack a underlying predetermined structure and versatile pieces to aid in learning the basics of notes and rhythm in a given measure of music.

There exists a need to have a more effective means to explain concepts to enable learners to rapidly acquire musical knowledge and grow quickly to mastery of musical ideas and ultimately understand how to read and perform music.

SUMMARY OF THE INVENTION

Accordingly, it is an object of embodiments of the present invention to provide an apparatus that allows for musical instruction with variable bar line tiles, notes, beats, rhythms and timing applied to a constant underlying structured mat having an underlying steady beat or quarter note imprint in the musical measure. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the invention comprises a musical instructional apparatus having a mat attachable to a vertical surface, said mat having an upper surface, an underneath surface, a top edge, a bottom edge, a right edge and a left edge, said edges disposed between the upper surface and the underneath surface, said upper surface having eight vertical lines extending from the bottom edge to the top edge dividing the upper surface into nine portions; the first portion comprises no imprint on the upper surface of the first portion and the last eight portions having a quarter note imprinted upon the upper surfaces of the last eight portions; said first portion divided vertically between a first space and a second space, said first space adapted to have a magnetic clef sign tile placed upon and magnetically attached to the first space, said magnetic clef sign selected from the group of magnetic clef sign tiles consisting of a magnetic treble clef sign tile, a magnetic bass clef sign tile and a magnetic alto clef sign tile, said second space adapted to have a magnetic time signature tile placed upon and magnetically attached to the second space, said magnetic time signature tile selected from the group of magnetic time signature tiles consisting of a magnetic two quarter time signature tile, a magnetic three quarter time signature tile and a magnetic four quarter time signature tile; and said vertical lines are adapted to have a bar line tile placed upon and magnetically attached to vertical line, said bar line tile is selected from the group of bar line tiles consisting of single bar line and a double bar line. In another embodiment, the invention further comprises any one of said last eight portions adapted to have a musical note one portion tile placed upon and magnetically attached to any one of said last eight portions, said musical note one portion tile selected from the group of magnetic note one portion tiles consisting of a magnetic attached two eighth note tile, a magnetic two detached eighth note tile, a magnetic quarter note rest tile and a magnetic four attached sixteenth note tile;

In one embodiment of the instant invention, the musical instruction apparatus comprises adhesive patch having a first surface affixed to the underneath surface of the mat and a second surface attachable to the vertical planar surface. In another embodiment of the instant invention, the mat comprises a magnet for attachment to the vertical surface. In yet another embodiment of the instant invention, the vertical surface comprises a Promethean Board®. And in still yet another embodiment of the instant invention, the mat comprises an adhesive cling mat.

Benefits and advantages of the present invention include, but are not limited to providing a mat that allows for a constant underlying measure in which the timing can accommodate two quarter, three quarter and four quarter time signatures by movement of a single bar line and double bar line magnetically attached and placed upon a mat having a full measure imprinted upon the mat and divided into.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
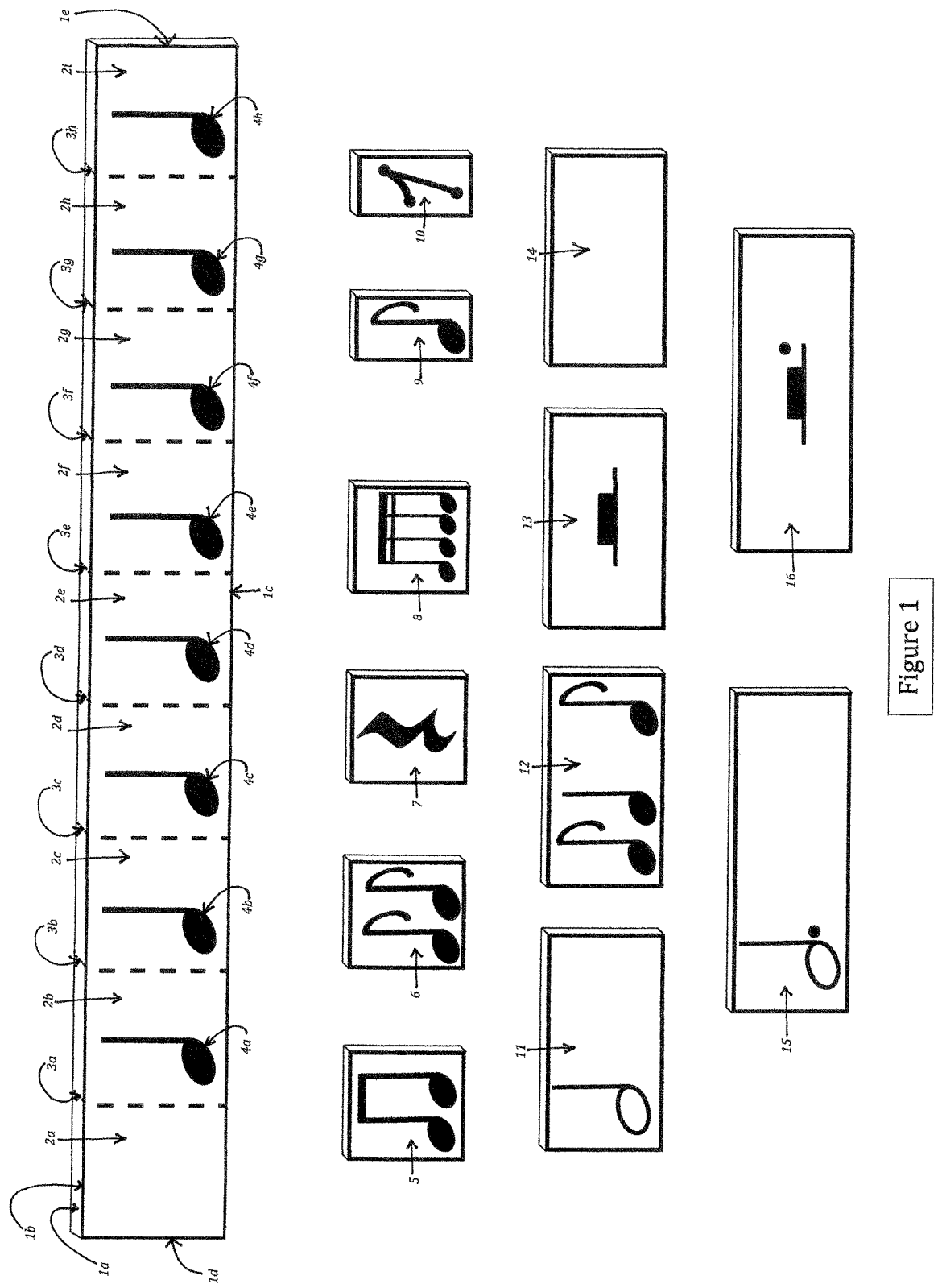
FIG. 1 is one embodiment of the instant invention depicting the mat and basic musical symbol tiles to be placed upon the mat.

Reference will now be made in detail to embodiments of the invention, examples of which are illustrated in the accompanying drawings. Throughout the following detailed description, the same reference characters refer to the same or similar elements in all figures.

FIG. 1 depicts a mat 1a having a rectangular shape attachable to a not depicted vertical surface. The mat 1a has a top edge 1b, a bottom edge 1c, a left edge 1d and a right edge 1e. The edges disposed between the upper surface and the not depicted underneath surface. The upper surface having eight vertical lines, 3a, 3b, 3c, 3d, 3e, 3f, 3g, and 3h extending from the bottom edge to the top edge dividing the upper surface into nine portions. The first portion 2a, farthest to the left, comprises no imprint on the upper surface of the first portion. The last eight portions to the right, namely, 2b, 2c, 2d, 2e, 2f, 2g, 2h, and 2i have a quarter note imprinted upon the upper surface of the last eight portions.

The first portion 2a is divided vertically between a first space, left-most, and a second space, right most space. The first space adapted to have a magnetic clef sign tile placed upon and magnetically attached to the first space. The second space adapted to have a magnetic time signature tile placed upon and magnetically attached to the second space.

FIG. 1 depicts quarter notes 4a, 4b, 4c, 4d, 4e, 4f, 4g and 4h imprinted upon the upper surface of the last eight portions, respectively.

FIG. 1 also depicts a magnetic two attached eighth note tile 5, a magnetic two detached eighth note tile 6, a magnetic quarter rest tile 7, a magnetic four attached sixteenth note tile 8, a magnetic single eighth note tile 9, a magnetic single eighth rest tile 10, a magnetic half note tile 11, a magnetic syncopation eighth note quarter note eighth note tile 12, a magnetic half rest tile 13 and 2 beat blank space tile 14, a magnetic dotted half note tile 15 and a magnetic dotted half rest tile 16. In one embodiment all the magnetic tiles are adapted for magnetic attachment to the mat. In another embodiment, all the magnetic tiles are adapted for magnetic attachment to the vertical surface.

Figure 2:
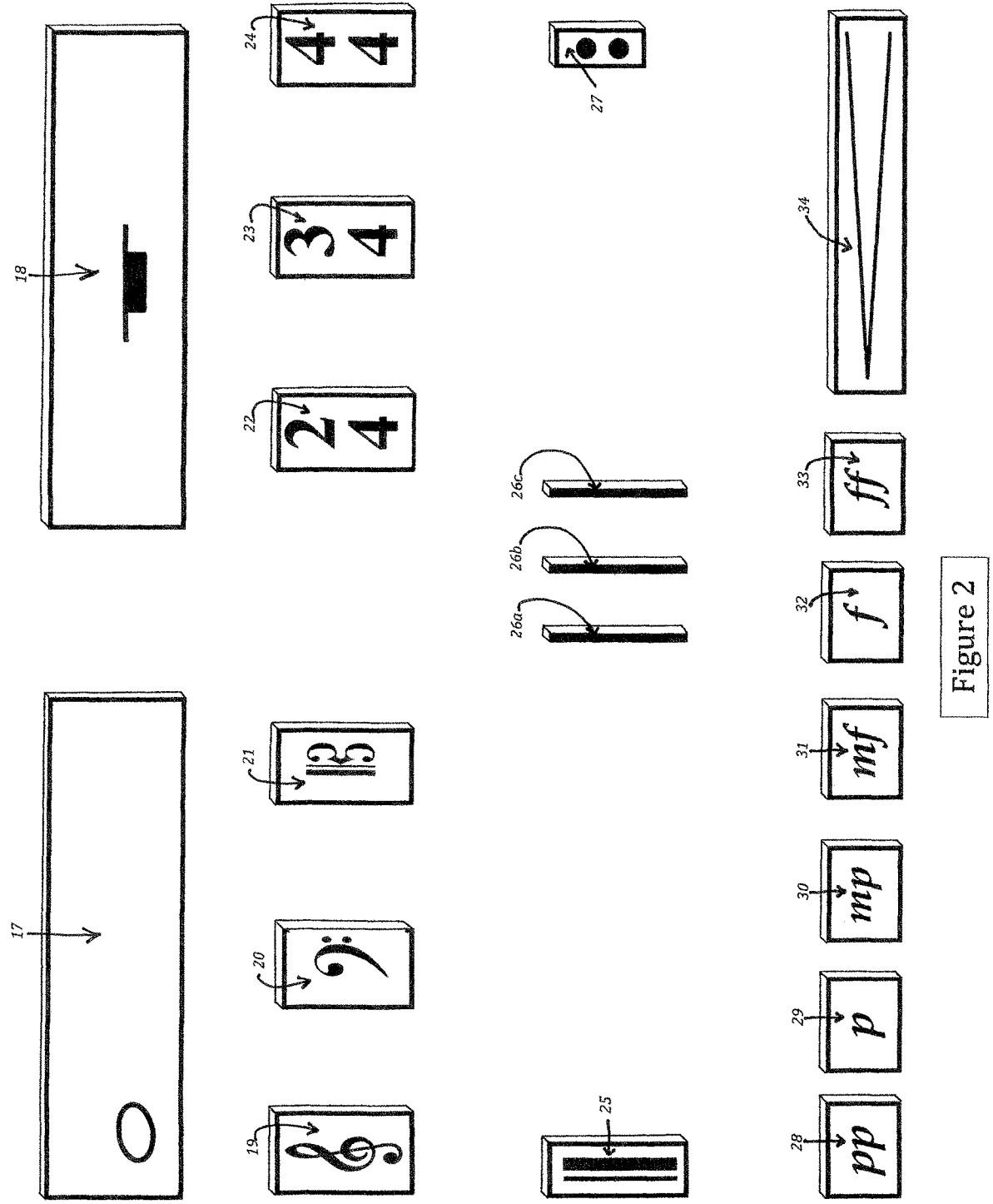
FIG. 2 depicts another embodiment of the instant invention depicting additional musical symbol tiles to be placed upon the mat.

FIG. 2 depicts a magnetic whole note tile 17, a magnetic whole rest tile 18, a magnetic treble clef sign tile 19, a magnetic bass clef sign tile 20, a magnetic alto clef sign tile 21, a magnetic two quarter time signature tile 22, a magnetic three quarter time signature tile 23, a magnetic four quarter time signature tile 24, a magnetic double bar line/ending bar line tile 25, magnetic single bar line tiles 26a, 26b and 26c, a magnetic two dots associated with repeat sign tile 27, a pianissimo dynamic sign tile 28, a piano dynamic sign tile 29, a mezzo-piano sign tile 30, a magnetic mezzo-forte dynamic sign tile 31, a magnetic forte dynamic sign tile 32, a magnetic fortissimo dynamic sign tile 33 and a magnetic crescendo dynamic sign tile 34.

The a magnetic single eighth note tile 9 and the magnetic single eighth rest tile 10 of FIG. 1 and the magnetic treble clef sign tile 19, the magnetic bass clef sign tile 20, the magnetic alto clef sign tile 21, the magnetic two quarter time signature tile 22 and the magnetic two dots associated with repeat sign tile 27 of FIG. 2 each comprise tiles sizes that are about half a portion size.

Figure 3:
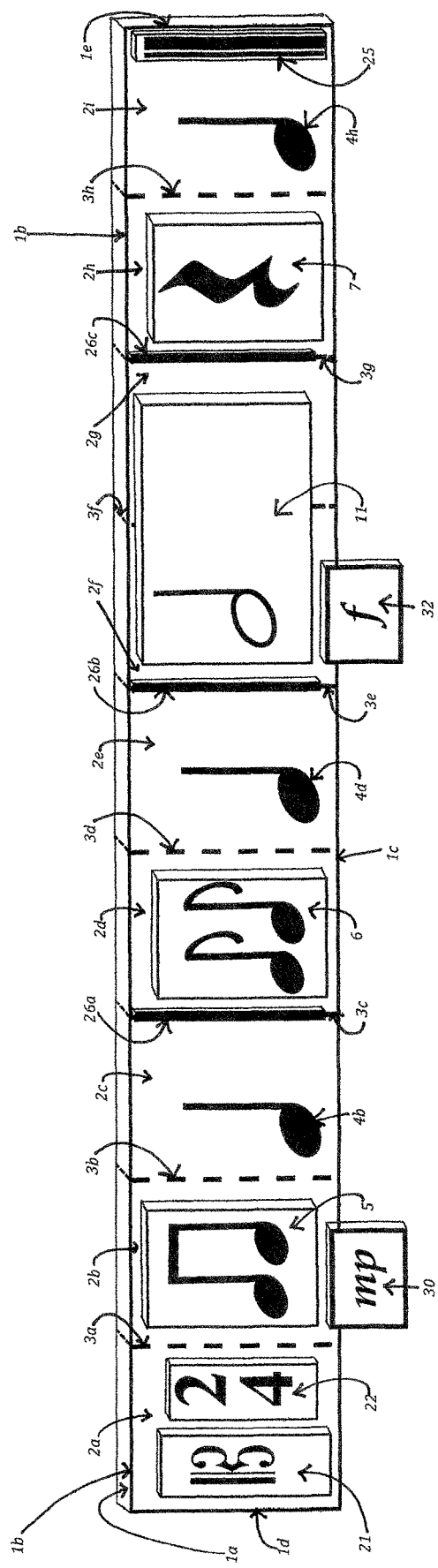
FIG. 3 depicts another embodiment of the instant invention wherein various musical symbol tiles are placed upon the mat.

FIG. 3 depicts the mat 1a having its generally rectangular shape with a top edge 1b, bottom edge 1c, left edge 1d and right edge 1e. The upper surface having eight vertical lines, 3a, 3b, 3c, 3d, 3e, 3f, 3g, and 3h extending from the bottom edge to the top edge dividing the upper surface into nine portions.

In FIG. 3, the first portion 2a has a first space having a magnetic alto clef sign tile placed upon and magnetically attached thereto and a second space having a magnetic two quarter time signature tile 22 placed upon and magnetically attached thereto. The second portion 2b has a magnetic two attached eighth note tile 5 placed upon and magnetically attached thereto and a mezzo-piano sign tile 30 placed upon and magnetically attached thereto on the bottom portion of the second portion 2b. The third portion 2c has no tile attached but rather depicts the imprinted quarter note 4b. The fourth portion 2d has a magnetic two detached eighth note tile 6 placed upon and magnetically attached thereto. The fifth portion 2e has no magnetic tile attached and merely depicts the imprinted quarter note 4d. The sixth portion 2f and seventh portion 2g have a magnetic half note tile 11 placed upon and magnetically attached thereto. Further, a magnetic forte dynamic sign tile 32 placed upon and magnetically attached to the bottom portion of the of the sixth portion 2f. The eighth portion 2h has a magnetic quarter rest tile 7 placed upon and magnetically attached thereto. The ninth portion 2i has no magnetic tile attached and merely depicts the imprinted quarter note 4h.

In FIG. 3, the third vertical line 3c between the third portion 2c and the fourth portion 2d is partially covered by the magnetic single bar line tile 26a placed upon and magnetically attached thereto, the fifth vertical line 3e between the fifth portion 2e and the sixth portion 2f is partially covered by the magnetic single bar line tile 26b placed upon and magnetically attached thereto and the seventh vertical line 3g between the seventh portion 2g and the eighth portion 2h is at least partially covered by the magnetic single bar line tile 26c placed upon and magnetically attached thereto. The very right portion of the ninth portion 2i is at least partially covered by the magnetic double bar line/ending bar line tile 25 placed upon and magnetically attached thereto.

FIG. 3 is one embodiment of the present invention that demonstrates how the placement of the bar lines can alter the time signature.

Figure 4:
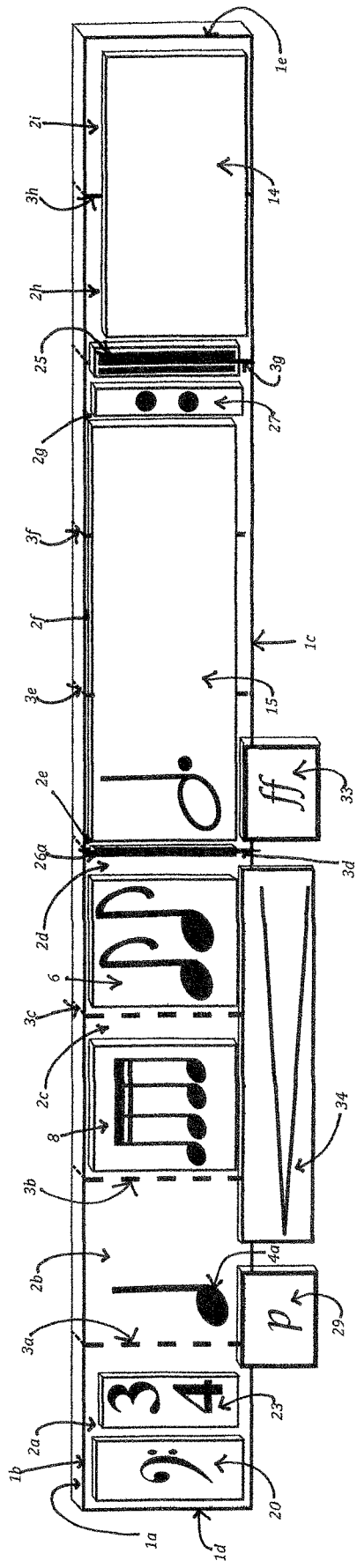
FIG. 4 depicts another embodiment of the instant invention wherein various musical symbol tiles are placed upon the mat.

FIG. 4 depicts the mat 1a having its generally rectangular shape with a top edge 1b, bottom edge 1c, left edge 1d and right edge 1e. The upper surface having eight vertical lines, 3a, 3b, 3c, 3d, 3e, 3f, 3g, and 3h extending from the bottom edge to the top edge dividing the upper surface into nine portions.

In FIG. 4, the first portion 2a has a first space having a magnetic bass clef sign tile 20 placed upon and magnetically attached thereto and second space having a magnetic three quarter time signature tile 23 placed upon and magnetically attached thereto. The second portion 2b has no magnetic tile attached to the imprinted quarter note 4a, but does have the piano dynamic sign tile 29 placed upon and magnetically attached to the bottom and left portion of the second portion 2b. The third portion 2c has the magnetic four attached sixteenth note tile 8 placed upon and magnetically attached thereto. The fourth portion has the magnetic two detached eighth note tile 6 placed upon and magnetically attached thereto. The bottom and right portion of the second portion 2b and the bottom portions of the third portion 2c and the fourth portion 2d have the magnetic crescendo dynamic sign tile 34 placed upon and magnetically attached thereto. The fifth portion 2e, the sixth portion 2f and the seventh portion 2g have the magnetic dotted half note tile 15 placed upon and magnetically attached thereto. Further the bottom portion of the fifth portion 2e has the magnetic fortissimo dynamic sign tile 33 placed upon and magnetically attached thereto. The right portion of the seventh portion 2g has the magnetic two dots associated with repeat sign tile 27 placed upon and magnetically attached thereto. The eighth portion 2h and the ninth portion 2i have the 2 beat blank space tile 14 placed upon and magnetically attached thereto.

In FIG. 4, the fourth vertical line 3d between the fourth portion 2d and the fifth portion 2e is partially covered by the magnetic single bar line tile 26a placed upon and magnetically attached thereto. The seventh vertical line 3g between the seventh portion 2g and the eighth portion 2h is at least partially covered by the magnetic double bar line/ending bar line tile 25 placed upon and magnetically attached thereto.

Figure 5:
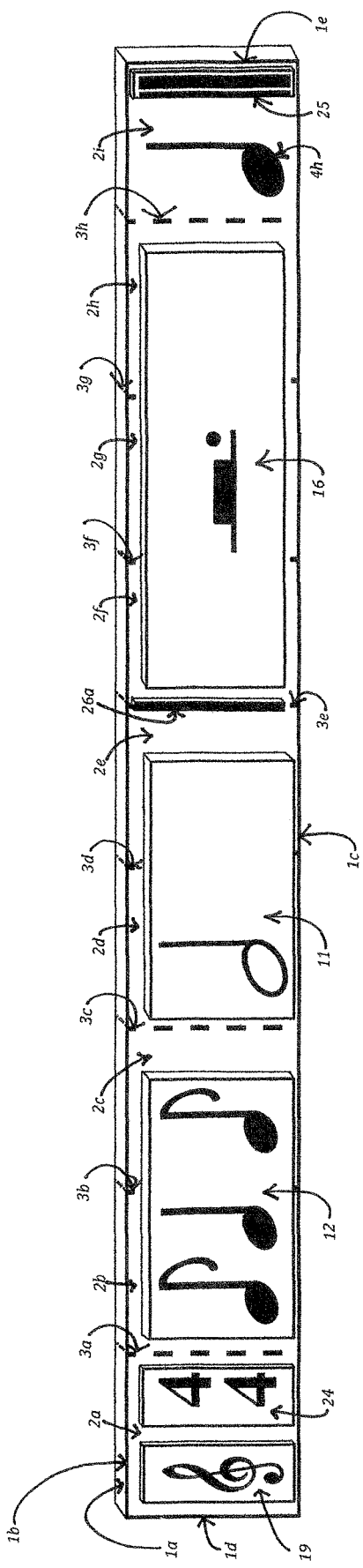
FIG. 5 depicts another embodiment of the instant invention wherein various musical symbol tiles are placed upon the mat.

FIG. 5 depicts the mat 1a having its generally rectangular shape with a top edge 1b, bottom edge 1c, left edge 1d and right edge 1e. The upper surface having eight vertical lines, 3a, 3b, 3c, 3d, 3e, 3f, 3g, and 3h extending from the bottom edge to the top edge dividing the upper surface into nine portions.

In FIG. 5, the first portion 2a has a first space having the magnetic treble clef sign tile 19 placed upon and magnetically attached thereto and a second space having the magnetic four quarter time signature tile 24 placed upon and magnetically attached thereto. The second portion 2b and the third portion 2c have the magnetic syncopation eighth note quarter note eighth note tile 12 placed upon and magnetically attached thereto. The fourth portion 2d and the fifth portion 2e have the magnetic half note tile 11 placed upon and magnetically attached thereto. The sixth portion 2f, the seventh portion 2g and the eighth portion 2h have the magnetic dotted half rest tile 16 placed upon and magnetically attached thereto. The ninth portion 2i has no magnetic tile attached and merely depicts the imprinted quarter note 4h.

In FIG. 5, the fifth vertical line 3e between the fifth portion 2e and the sixth portion 2f is partially covered by the magnetic single bar line tile 26a placed upon and magnetically attached thereto. The very right portion of the ninth portion 2i is at least partially covered by the magnetic double bar line/ending bar line tile 25 placed upon and magnetically attached thereto.

Figure 6:
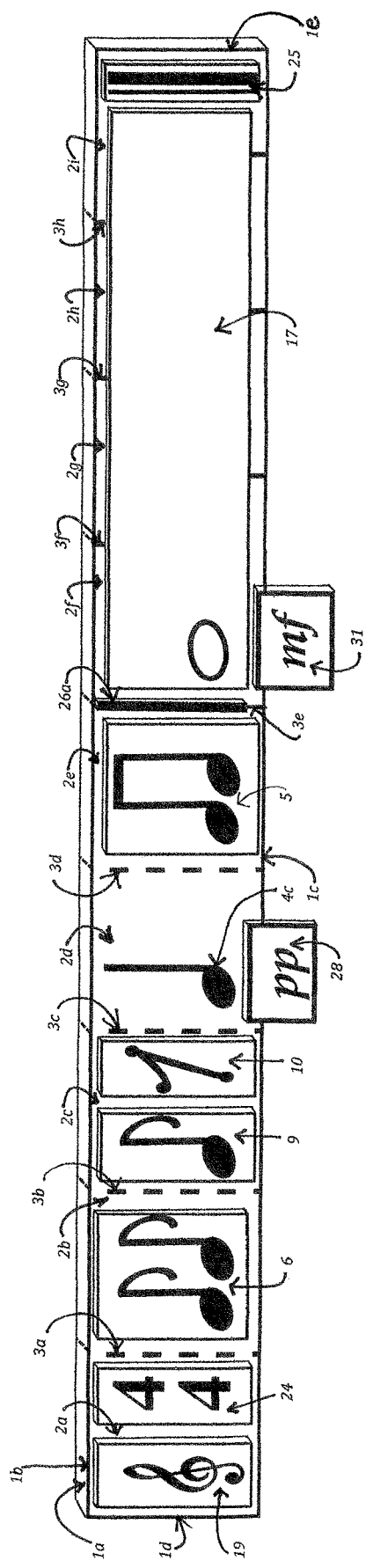
FIG. 6 depicts another embodiment of the instant invention wherein various musical symbol tiles are placed upon the mat.

FIG. 6 depicts the mat 1a having its generally rectangular shape with a top edge 1b, bottom edge 1c, left edge 1d and right edge 1e. The upper surface having eight vertical lines, 3a, 3b, 3c, 3d, 3e, 3f, 3g, and 3h extending from the bottom edge to the top edge dividing the upper surface into nine portions.

In FIG. 6, the first portion 2a has a first space having the magnetic treble clef sign tile 19 placed upon and magnetically attached thereto and a second space having the magnetic four quarter time signature tile 24 placed upon and magnetically attached thereto. The second portion 2b has the magnetic two detached eighth note tile 6 placed upon and magnetically attached thereto. In the left portion of the third portion 2c the magnetic single note eighth note tile 9 is placed upon and magnetically attached thereto and in the right portion of the third portion 2c the magnetic single eighth rest tile 10 is placed upon and magnetically attached thereto. The fourth portion 2d has no magnetic tile attached thereto except for the pianissimo dynamic sign tile 28 placed upon and magnetically attached to the bottom portion of the fourth portion 2d. The fifth portion 2e has the magnetic two attached eighth note tile 5 placed upon and magnetically attached thereto. The sixth portion 2f, the seventh portion 2g, the eighth portion 2h and ninth portion 2i have the have magnetic whole note tile 17 placed upon and magnetically attached thereto. The sixth portion 2f further has the magnetic mezzo-forte dynamic sign tile 31 placed upon and magnetically attached to the bottom portion of the sixth portion 2f.

In FIG. 6, the fifth vertical line 3e between the fifth portion 2e and the sixth portion 2f is at least partially covered by the magnetic single bar line tile 26a placed upon and magnetically attached thereto. The very right portion of the ninth portion 2i is at least partially covered by the magnetic double bar line/ending bar line tile 25 placed upon and magnetically attached thereto.

FIG. 3, FIG. 4, and FIG. 5 and FIG. 6 are merely example embodiments of the musical symbol magnetic tiles placed upon the mat. In one embodiment, the vertical surface comprises a metallic composition and the mat is magnetic thereby magnetically allowing attachment of the mat to the vertical surface. In another embodiment the vertical surface comprises an interactive vertical board or a Promethian Board®. Further FIGS. 2, 4 and 5 demonstrate the versatility of the invention in that the time signature is altered on a single mat to accommodate the bar line changes between the three figures for a two quarter, a three quarter and a four quarter time signature. Thus, the bar lines can be adjusted relative to the applicable time signature tile, i.e., in FIG. 3, the time signature is two quarter time and the bar lines are between the third and fourth portions, the fifth and sixth portions and the seventh and eighth portions, thereby creating a two quarter time signature on the same mat that the three quarter time signature is displayed in FIG. 4 or the four quarter time signature is displayed in FIG. 5. The modification between the various time signature is accomplished by merely adjusting the bar lines 26a, 26b and 26c respectively. FIGS. 3, 4 and 5 show a relationship between time signatures and bar lines, which makes music easier for students to learn.

It is believed that the apparatus of the present invention and many of its attendant advantages will be understood from the foregoing description. It is also believed that it will be apparent that various changes may be made in the form, construction, and arrangement of the components without departing from the scope and spirit of the invention and without sacrificing its material advantages. The forms described are merely exemplary and explanatory embodiments thereof. It is the intention of the following claims to encompass and include such changes.

What is claimed is:

1. A musical instructional apparatus comprising:
   (a) a mat attachable to a vertical surface, said mat having an upper surface, an underneath surface, a top edge, a bottom edge, a right edge and a left edge, said edges disposed between the upper surface and the underneath surface, said upper surface having eight vertical lines extending from the bottom edge to the top edge dividing the upper surface into nine portions; the first portion comprises no imprint on the upper surface of the first portion and the last eight portions having a quarter note imprinted upon the upper surfaces of the last eight portions;
   (b) said first portion divided vertically between a first space and a second space, said first space adapted to have a magnetic clef sign tile placed upon and magnetically attached to the first space, said magnetic clef sign selected from the group consisting of magnetic clef sign tiles consisting of a magnetic treble clef sign tile, a magnetic bass clef sign tile and a magnetic alto clef sign tile, said second space adapted to have a magnetic time signature tile placed upon and magnetically attached to the second space, said magnetic time signature tile selected from the group of magnetic time signature tiles consisting of a magnetic two quarter time signature tile, a magnetic three quarter time signature tile and a magnetic four quarter time signature tile;
   (c) said vertical lines are adapted to have a bar line tile placed upon and magnetically attached to vertical line, said bar line tile is selected from the group consisting of bar line tiles consisting of single bar line and a double bar line.

2. The musical instruction apparatus of claim 1, wherein any one of said last eight portions are adapted to have a musical note one portion tile placed upon and magnetically attached to any one of said last eight portions, said musical note one portion tile selected from the group of magnetic note one portion tiles selected from the group consisting of a magnetic attached two eighth note tile, a magnetic two detached eighth note tile, a magnetic quarter rest tile and a magnetic four attached sixteenth note tile.

3. The musical instruction apparatus of claim 1, wherein any two adjacent portions of the last eight portions are adapted to have a musical note two portion tile placed upon and magnetically attached to any two adjacent portions of the last eight portions, said musical note two portion tile is selected from the group consisting of musical two note portion tiles consisting of a magnetic half note tile, a magnetic syncopation eighth note quarter note eighth note tile, a magnetic half rest tile and a magnetic two beat blank space tile.

4. The musical instruction apparatus of claim 1, wherein, any three adjacent portions of the last eight portions are adapted to have a musical three portion tile placed upon and magnetically attached to any three adjacent portions of the last eight portions, said musical three portion tile is selected from the group consisting of musical three portion tiles consisting of a magnetic dotted half note tile and a magnetic dotted half rest tile.

5. The musical instruction apparatus of claim 1, wherein any one portion of the last eight portions are adapted to have a musical note one half portion tile placed upon and magnetically attach to any one portion of the last eight portions, said musical note half portion tile is selected from the group consisting of a magnetic single eighth note tile, a magnetic single eighth rest tile and a magnetic two dots associated with repeat sign tile.

6. The musical instruction apparatus of claim 1, wherein any four adjacent portions of the last eight portions are adapted to have a musical four portion tile placed upon and magnetically attached to any four adjacent portions of the last eight portions, said musical four portion tile is selected from the group consisting of a magnetic whole note tile and a magnetic whole rest tile.

7. The musical instruction apparatus of claim 1 further comprising a magnetic pianissimo dynamic mark tile, a magnetic piano dynamic mark tile, a magnetic mezzo piano dynamic mark tile, a magnetic mezzo forte dynamic mark tile, a magnetic forte dynamic mark tile, a magnetic fortissimo dynamic mark tile and a magnetic crescendo dynamic mark tile magnetically adapted for attachment to any one of said last eight portions.

8. The musical instruction apparatus of claim 1 wherein the mat comprises a magnet for attachment to the vertical surface.

9. The musical instruction apparatus of claim 1 wherein the vertical surface comprises an interactive white board.

10. The musical instruction apparatus of claim 1 wherein the mat comprises an adhesive cling mat.

11. A musical instructional apparatus comprising:
(a) a mat attachable to a vertical surface, said mat having an upper surface, an underneath surface, a top edge, a bottom edge, a right edge and a left edge, said edges disposed between the upper surface and the underneath surface, said upper surface having eight vertical lines extending from the bottom edge to the top edge dividing the upper surface into nine portions; the first portion comprises no imprint on the upper surface of the first portion and the last eight portions having a quarter note imprinted upon the upper surfaces of the last eight portions;

(b) said first portion divided vertically between a first space and a second space, said first space adapted to have a magnetic clef sign tile placed upon and magnetically attached to the first space, said magnetic clef sign selected from the group consisting of magnetic clef sign tiles consisting of a magnetic treble clef sign tile, a magnetic bass clef sign tile and a magnetic alto clef sign tile, said second space adapted to have a magnetic time signature tile placed upon and magnetically attached to the second space, said magnetic time signature tile selected from the group of magnetic time signature tiles consisting of a magnetic two quarter time signature tile, a magnetic three quarter time signature tile and a magnetic four quarter time signature tile;

(c) any one of said last eight portions are adapted to have a musical note one portion tile placed upon and magnetically attached to any one of said last eight portions, said musical note one portion tile selected from the group of magnetic note one portion tiles selected from the group consisting of a magnetic attached two eighth note tile, a magnetic two detached eighth note tile, a magnetic quarter rest tile and a magnetic four attached sixteenth note tile; and (d) said vertical lines are adapted to have a bar line tile placed upon and magnetically attached to vertical line, said bar line tile is selected from the group consisting of bar line tiles consisting of single bar line and a double bar line.

12. The musical instruction apparatus of claim 11, wherein any two adjacent portions of the last eight portions are adapted to have a musical note two portion tile placed upon and magnetically attached to any two adjacent portions of the last eight portions, said musical note two portion tile is selected from the group consisting of musical two note portion tiles consisting of a magnetic half note tile, a magnetic syncopation eighth note quarter note eighth note tile, a magnetic half rest tile and a magnetic two beat blank space tile.

13. The musical instruction apparatus of claim 11, wherein any three adjacent portions of the last eight portions are adapted to have a musical three portion tile placed upon and magnetically attached to any three adjacent portions of the last eight portions, said musical three portion tile is selected from the group consisting of musical three note portion tiles consisting of a magnetic dotted half note tile and a magnetic dotted half rest tile.

14. The musical instruction apparatus of claim 11, wherein any one portion of the last eight portions are adapted to have a musical note one half portion tile placed upon and magnetically attach to any one portion of the last eight portions, said musical note half portion tile is selected from the group consisting of a magnetic single eighth note tile, a magnetic single eighth rest tile and a magnetic two dots associated with repeat sign tile.

15. The musical instruction apparatus of claim 11, wherein any four adjacent portions of the last eight portions are adapted to have a musical four portion tile placed upon and magnetically attached to any four adjacent portions of the last eight portions, said musical four portion tile is selected from the group consisting of whole note tile and a magnetic whole rest tile.

16. The musical instruction apparatus of claim 11 further comprising a magnetic pianissimo dynamic mark tile, a magnetic piano dynamic mark tile, a magnetic mezzo piano dynamic mark tile, a magnetic mezzo forte dynamic mark tile, a magnetic forte dynamic mark tile, a magnetic fortissimo dynamic mark tile and a magnetic crescendo dynamic mark tile magnetically adapted for attachment to any one of said last eight portions.

17. The musical instruction apparatus of claim 11 further comprising an adhesive affixed to the underneath surface of the mat and to a vertical planar surface.

18. The musical instruction apparatus of claim 11 wherein the mat comprises a magnet for attachment to the vertical surface.

19. The musical instruction apparatus of claim 11 wherein the vertical surface comprises an interactive white board.

20. The musical instruction apparatus of claim 11 wherein the mat comprises an adhesive cling mat.

\* \* \* \* \*